July 23, 1935.  C. T. CARLSON  2,009,160
BOILER
Filed Feb. 23, 1932  3 Sheets-Sheet 2

Carl T. Carlson
INVENTOR.

BY
ATTORNEYS.

Patented July 23, 1935

2,009,160

UNITED STATES PATENT OFFICE 2,009,160

BOILER

Carl T. Carlson, Erie, Pa., assignor to Erie City Iron Works, Erie, Pa., a corporation of Pennsylvania Application February 23, 1932, Serial No. 594,613

30 Claims. (Cl. 122—265)

The present invention is designed to improve steam generators and is particularly advantageous with relation to what are known as drumless generators.

Steam generators operating in various conditions of service are subjected to wide variations in steam production. This introduces into the type of drumless generators more definitely the problem of delivering from the generator a uniform quality of steam and particularly dry steam.

Where the rating is very largely increased the efficiency of the generator usually decreases because the gases actually wiping the wetted portions of the heat exchanging surfaces are not materially increased with the added flow of gases. Consequently the heat exchange per unit of gas becomes less effective and the exit gas temperatures rise. In the present invention this is modified by utilizing the increased up-flow of the steam generating water under higher ratings to increase the wetting of the surfaces of the tubes subjected to the gases so that a greater wetted surface is subjected to the gases when the generator is working at higher ratings.

The invention is also designed to more thoroughly separate the steam, or vapor, from the water so as to deliver with greater certainty drier steam and also contemplates a more definite control of the steam quality. Provision is, therefore, made whereby the available heat may be more definitely directed to increasing evaporation under which conditions the superheating with the same fuel output is somewhat decreased, or these conditions may be reversed to satisfy the various conditions of service and the rating at which the generator is being operated. In this way the quality of the steam leaving the generator proper may be more definitely controlled as it reaches the superheater proper so as to avoid scaling of the superheater and so as to effect the final delivery of the desired quality of steam.

The invention also contemplates the confining of the water and water and steam mixture in the up-flow portions so that the water level may be automatically varied with the rating and this variation is taken advantage of in varying the wetting of the surfaces of the heat exchange surfaces. Such confining of the water also reduces the surging of the water which is of advantage under certain conditions of use, such as marine use.

The invention also contemplates the forming of the steam generator in sections that may be placed side by side, thus extending the boiler sidewise indefinitely. Each section is formed with headers, preferably of rectangular form, so as to provide for the ready insertion of the tubes and the boiler is also provided with steam take-off headers, as well as separator headers, and contemplates the returning of the water separated to the general circulation of the boiler. Preferably also the feed water is introduced in a manner to assist the circulation. Water gauges are also so arranged as to more correctly indicate the effective water level.

The invention also contemplates as a method of generating steam the heating of the liquid while in motion to form a mixture of liquid and steam causing the liquid to flow horizontally at low velocity while the liquid of the mixture wholly, or partially, separates from the steam, and further heating the steam thus produced and also contemplates in this connection the draining off of the separated steam. It also involves the control of the heat delivered to the steam as it moves horizontally to control the evaporation as compared to the amount of superheat.

It also contemplates as a method the variation of the wetted surfaces as the rating of the generator is increased so that the effective heat exchange surfaces may be increased as the rating is increased.

A preferred embodiment of the generator of the invention and by means of which the method may be practiced is illustrated in the accompanying drawings as follows:—

Figure 1:
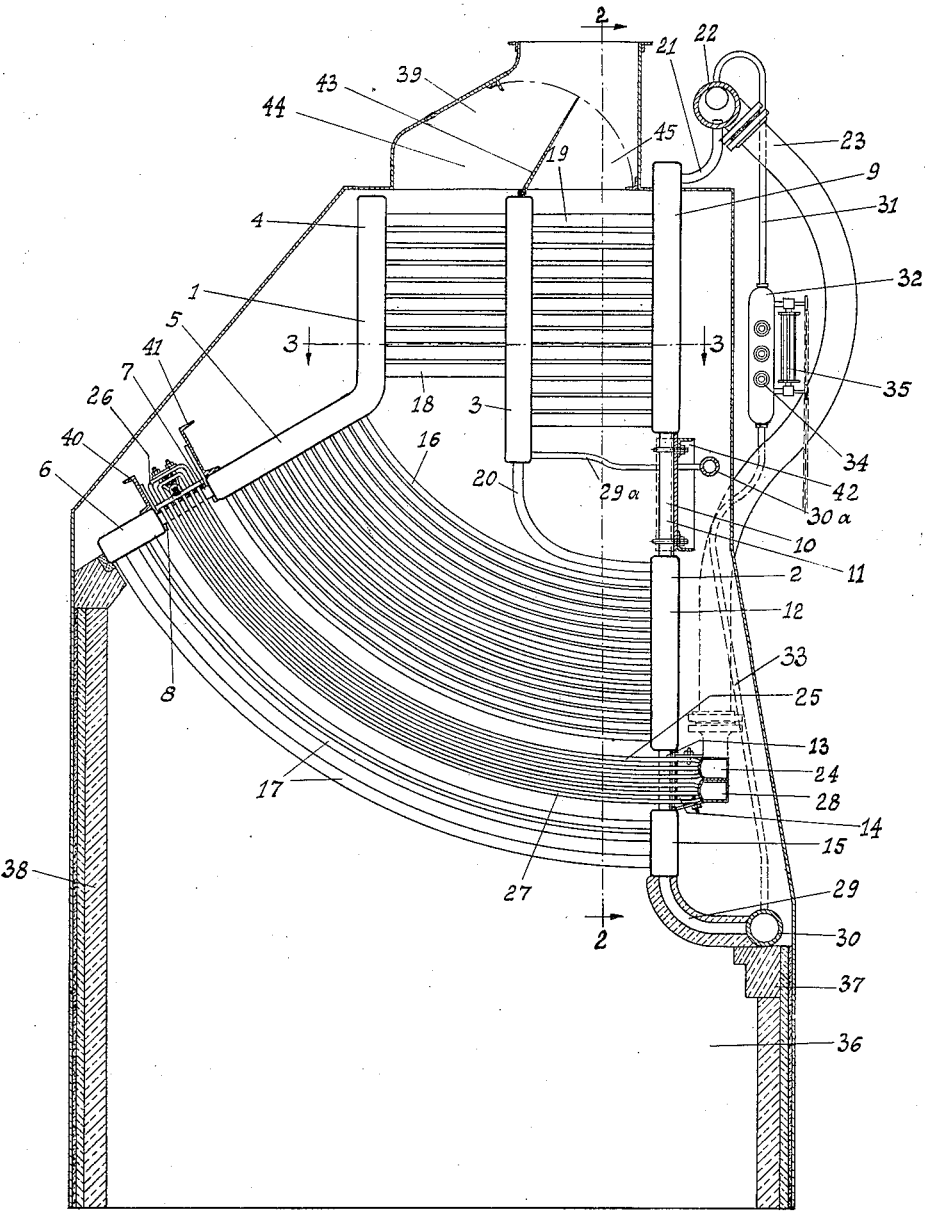
Fig. 1 shows a central vertical section of the boiler.
Figure 2:
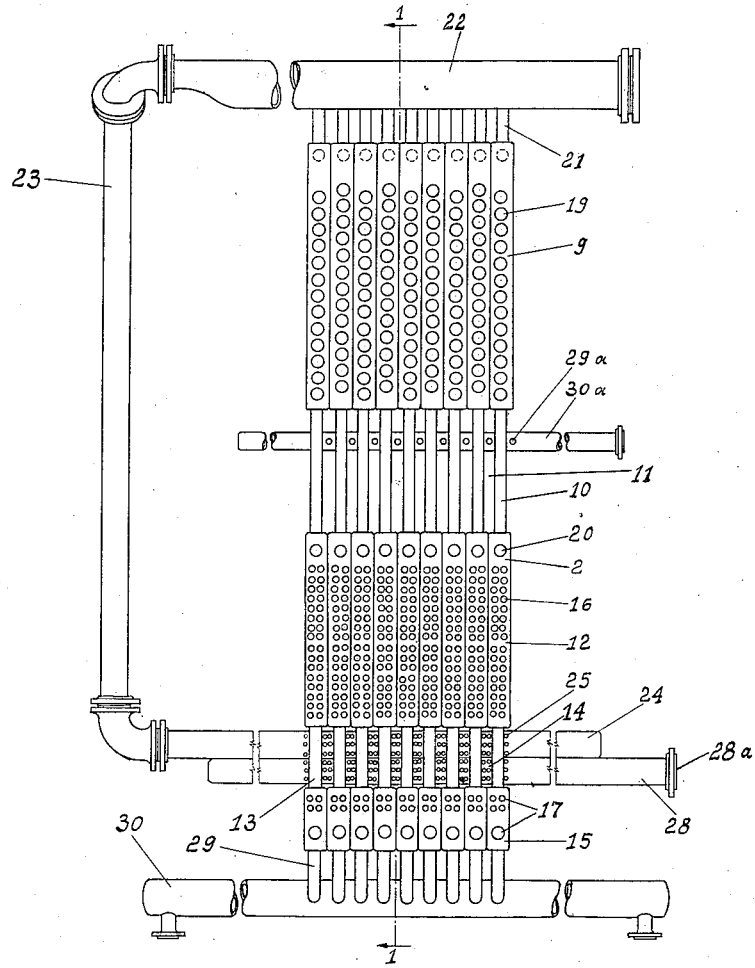
Fig. 2 shows a section on the line 2—2 in Fig. 1.
Figure 3:
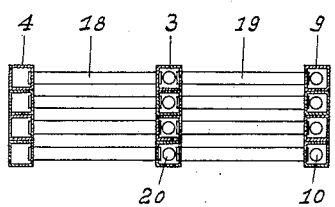
Fig. 3 shows a section on the line 3—3 in Fig. 1.

In Figs. 1, 2 and 3, I marks the up-take header, 2 the down-take header, and 3 a separator header introduced between the upper ends of the up-take and down-take headers. The up-take header has an upper vertical portion 4 and an inclined portion 5, and a bottom portion 6, the parts 5 and 6 being connected by tubes 7 providing spaces 8 between the tubes when the headers are assembled. The down-take header has an upper vertical portion 9. A series of tubes 10 extend from the upper portion 9 and afford spaces 11 between adjoining headers. A middle header portion 12 from which tubes 13 extend provides spaces 14 in the assembled structure, and lead to a lower header portion 15. These are box-shaped, or rectangular in cross section. The inclined portion 5 of the up-take header is connected with the middle portion 12 of the down-take header by tubes 16. These tubes are curved so that they may be readily removed through either header and if removed through the header, will require a comparatively small space. Tubes 17 connect the lower portions 6 and 15. These are also curved in the manner of and for the same purpose as the tubes 16. Laterally extending tubes 18 connect the upper portion 4 of the header 1 with the separator header 3 and similarly extending tubes 19 connect the separator header with the upper portion 9 of the header. The tubes 18 and 19 are preferably larger than the steaming tubes and have a larger capacity so that the passage of water, or mixture, or steam, through such lateral tubes is comparatively slow. These tubes are staggered with relation to each other in adjacent units, as clearly indicated in Fig. 2. This gives a more effective path to the gases. The tubes 19 are directly opposite the tubes 18 so that the ends of these tubes may be headed over, either by operation through the openings in the headers for the opposite tubes, or by operation directed through the opposite tubes themselves. This affords a very effective method of fabrication.

The upper portion of the header 1 has less capacity than the lateral tubes 18 and 19. The water level is at the lower end of the vertical portion of the header 1 so that as the steam is liberated a very definite up-flow of the steam carrying water takes place and water and steam is carried into the tubes 18. The capacity of these banks of tubes relatively to the header 1 is large so that the passage through these tubes is comparatively slow and the moisture carried by the steam reaches the bottom of the tubes 18 wetting the bottoms of these tubes and, therefore, taking up a greater percentage of the heat of the passing gases. As the rate is increased this up-flow of steam-laden liquid becomes more violent and the higher tubes 18, as well as the lower tubes have their surfaces wetted by the water carried by the steam and consequently a greater proportion of the heat from the gases is taken up so that there is a lesser drop in efficiency as the boiler is forced to higher ratings. As the steam, and with it any water that may be evaporated, passes to the separator header, whatever moisture is carried into the header is more or less subjected to the action of the steam from the tubes below it so that a certain amount of this moisture is taken up by the steam receiving superheat in the tubes 18. The greater part of the moisture, however, that is not taken up reaches the bottom of the header and is taken off by a drainage tube 20 and returned to the middle portion of the header 2. The steam then continues through the tubes 19 further superheating the steam and here again any moisture that may be carried over into the tubes 19 wets those surfaces so as to effect a more definite heat exchange and the moisture is carried to the higher levels of these tubes as the rating is increased.

It will be understood that these tube units comprising the box-shaped headers 1, 2 and 3, with their associated tubes are spaced side by side as indicated in Fig. 2, thus extending the boiler to any width desired, it being understood that the headers 1 correspond in cross sectional shape to the header 2. A steam out-take discharge pipe 21 leads from each header portion 9 into a manifold 22. A pipe 23 leads from the manifold to a superheater manifold 24. Superheater tubes 25 are connected to the manifold 24 and extend through the spaces 14 and spaces 8 and are looped at 26 and have the returns 27 leading to a manifold 28 from which the steam is discharged at 28a.

A water feed and blow-off manifold 30 is connected by a tube 29 with the lower end of the header 2. An auxiliary water feed manifold 30a is connected by the tubes 29a with the lower ends of the headers 3, the tubes 29a extending through the spaces 11. The feed water delivered to the lower part of the separator header more thoroughly cools that water and assures a more definite downward circulation of the separator water, or mixture. A pipe 31 extends from the manifold 22 to a gauge fitting 32, the lower end of this gauge fitting being connected by a pipe 33 with the manifold 30. Gauge water valves 34 are provided in the fitting 32 and a gauge glass 35 is also connected therewith. This placing of the water gauges gives a more accurate reading as to the water level in that any surging, or up-flow of the water in the up-take side is accompanied by some reaction incident to the evolving of the steam in the up-take side.

The furnace may be of any desired form. As shown it has the side walls 36 and front and rear walls 37 and 38. The boiler is secured in the walls by beams 40 and 41 secured to the lower end of the header and a beam 42 secured to the tubes 19 of the down-take header 2.

The separation of the headers into sections permits of the very convenient support of the generator at points intermediate the top and bottom thereof so that the expansion from the point of support is reduced.

The furnace is fired below the tubes 17, the gases passing through these tubes, through the superheater tubes, and tubes 16, and through the tubes 18 and 19, into the smoke flue 39. The tubes 19, at least and particularly the upper portions of these tubes, operating largely on steam from which the water has been separated, act to some extent as superheating tubes.

A controlling baffle 43 is mounted on the intermediate header 3 and may be adjusted to vary the flow of gas either through a channel 44 between the header portion 4 and header 3, or a channel 45 between the separating header 3 and the upper portion 9 of the header 2. This control permits of the regulation of the heated gases so that a greater portion of it may be used to increase the evaporation with a lesser amount utilized for superheating. This is accomplished when the baffle is adjusted to form a greater restriction to the channel 45 and to interpose less obstruction to the channel 44, or the flow of gases may be utilized so as to increase the superheat with a corresponding decrease in the evaporation. This is accomplished by adding to the restriction through the channel 44 by moving the baffle toward that channel and giving greater freedom to the flow through the channel 45. In this way the generator may be very nicely controlled as to its requirements and the quality of the steam delivered to the superheater 33 may be very definitely controlled so that there will be very little but dry steam added to the superheater, thus avoiding scaling of the superheater and also controlling the quality of steam finally delivered. This control is of particular importance with drumless boilers where, by reason of the lack of comparatively large spaces where the steam is brought more nearly to rest the separation and control of the quality of the steam presents a more definite problem.

Figure 4:
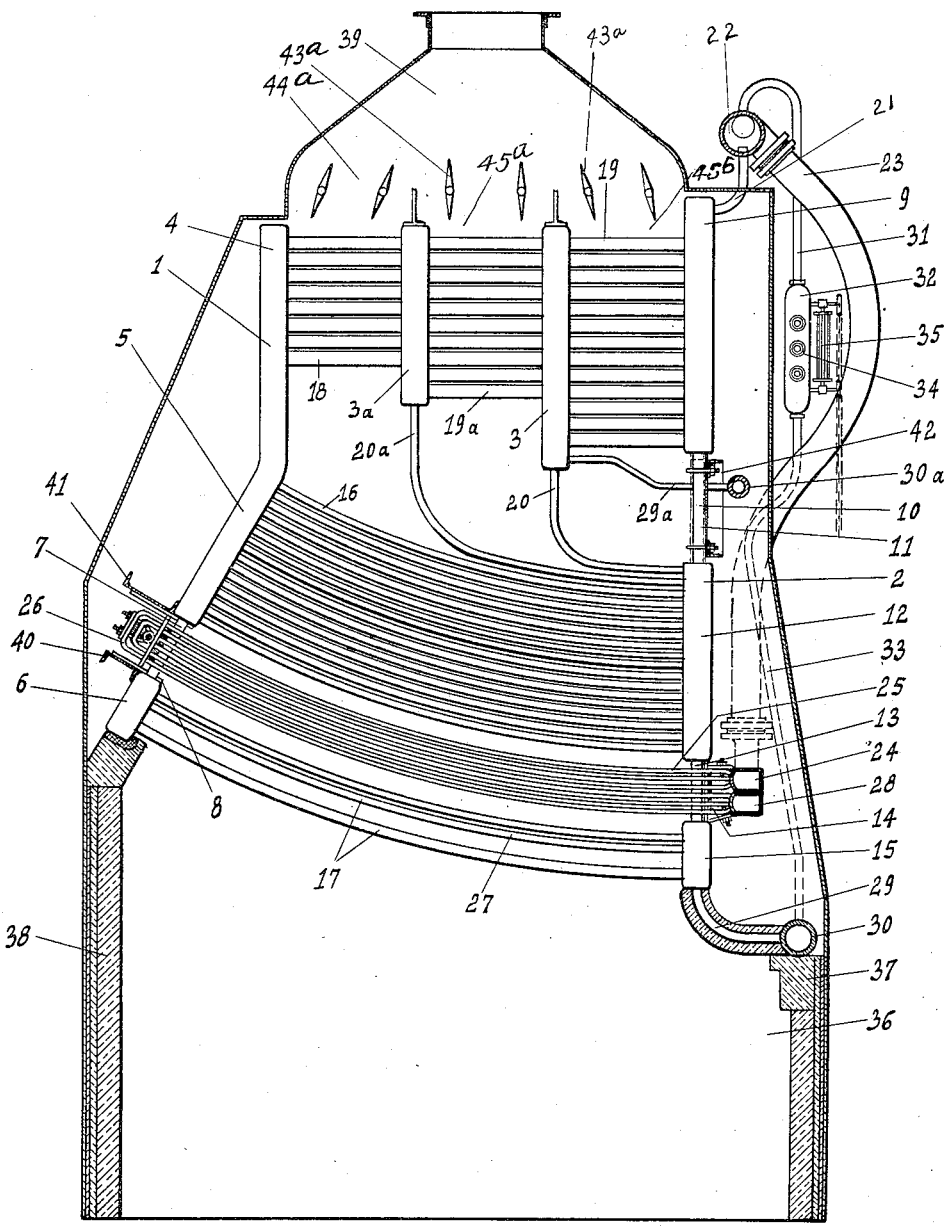
Fig. 4 shows a modification of the generator.

In the modification shown in Fig. 4, I have shown an added separator header 3a, thus affording three gas channels 44a, 45a and 45b. The headers 3a and 3 are connected by horizontal tubes 19a and a drainage tube 20a leads from the header 3a to the intermediate portion 12 of the header 2. Deflectors 43a are supplied by means of which the flow through each of these channels may be regulated and the degree of evaporation as contrasted with the superheat may be regulated in the manner suggested with relation to the structure in Fig. 3. It will be understood that as the number of channels is increased the evaporating tubes may be driven to a higher rating with an assurance of complete separation in the final bank of horizontal tubes. Some of the evaporation may be carried over beyond the first bank of tubes to a second, or later bank of tubes.

While I have mentioned the wetted surfaces and refer to this invention as a steam generator, I wish to be understood as including generators producing vapor from other liquids than water.

What I claim as new is:—

1. In a boiler, the combination of water-containing steam generating lower members and connected upper members comprising an upwardly extending header portion receiving at its lower end an up-flow from the lower members; and gas heated tubes of greater capacity than and extending laterally from the header in stepped relation to each other and to the water level some being above and some below the water level to vary the wetting of the tubes with variations of the steaming condition of the up-flow, said laterally extending tubes being laterally separated into banks by an upwardly extending drainage header into and from which the laterally arranged tubes extend.

2. In a boiler, the combination of water-containing steam generating lower members and connected upper members comprising an upwardly extending header portion receiving at its lower end an up-flow from the lower members; and gas heated tubes of greater capacity than and extending laterally from the header in stepped relation to each other and to the water level some being above and some below the water level to vary the wetting of the tubes with variations of the steaming condition of the up-flow, said laterally extending tubes being laterally separated into banks by a plurality of upwardly extending drainage headers into and from which the laterally arranged tubes extend.

3. In a boiler, the combination of water-containing steam generating lower members and connected upper members comprising an upwardly extending header portion receiving at its lower end an up-flow from the lower members; gas heated tubes extending laterally from the header in stepped relation to each other and to the water level to vary the wetting of the tubes with variations of the steaming condition of the up-flow, said laterally extending tubes being laterally separated into banks by an upwardly extending drainage header into and from which the laterally arranged tubes extend; and means varying the proportionate gas flow at opposite sides of the drainage header.

4. In a boiler, the combination of water-containing steam generating lower members and connected upper members comprising an upwardly extending header portion receiving at its lower end an up-flow from the lower members; gas heated tubes extending laterally from the header in stepped relation to each other and to the water level to vary the wetting of the tubes with variations of the steaming condition of the up-flow, said laterally extending tubes being laterally separated into banks by a plurality of upwardly extending drainage headers into and from which the laterally arranged tubes extend; and means varying the proportionate gas flow at opposite sides of the drainage headers.

5. In a boiler, the combination of water-containing steam generating lower members and connected upper members comprising an upwardly extending header portion receiving at its lower end an up-flow from the lower members; gas heated tubes of greater capacity than and extending laterally from the header in stepped relation to each other and to the water level some above and some below the water level to vary the wetting of the tubes with variations of the steaming condition of the up-flow, said laterally extending tubes being laterally separated into banks by an upwardly extending drainage header into and from which the laterally arranged tubes extend; and a return connection from the drainage header to the water containing members.

6. In a boiler, the combination of water-containing steam generating lower members and connected upper members comprising an upwardly extending header portion receiving at its lower end an up-flow from the lower members; gas heated tubes of greater capacity than and extending laterally from the header in stepped relation to each other and to the water level to vary the wetting of the tubes with variations of the steaming condition of the up-flow, said laterally extending tubes being laterally separated into banks by a plurality of upwardly extending drainage headers into and from which the laterally arranged tubes extend; and a return connection from the drainage headers to the water containing members.

7. In a boiler, the combination of water-containing steam generating lower members and connected upper members comprising an upwardly extending header portion receiving at its lower end an up-flow from the lower members; gas heated tubes extending laterally from the header in stepped relation to each other and to the water level to vary the wetting of the tubes with variations of the steaming condition of the up-flow, said laterally extending tubes being laterally separated into banks by an upwardly extending drainage header into and from which the laterally arranged tubes extend; a return connection from the drainage header to the water containing members; and means varying the proportionate gas flow at opposite sides of the drainage header.

8. In a boiler, the combination of water-containing steam generating lower members and connected upper members comprising an upwardly extending header portion receiving at its lower end an up-flow from the lower members; gas heated tubes extending laterally from the header in stepped relation to each other and to the water level to vary the wetting of the tubes with variations of the steaming condition of the up-flow, said laterally extending tubes being laterally separated into banks by a plurality of upwardly extending drainage headers into and from which the laterally arranged tubes extend; a return connection from the drainage headers to the water containing members; and means varying the proportionate gas flow at opposite sides of the drainage headers.

9. In a boiler, the combination of water-containing steam generating lower members and connected upper members comprising an upwardly extending header portion receiving at its lower end the up-flow from the lower members; two upwardly extending headers spaced from each other and from the upwardly extending header portion; laterally extending gas heated tubes connecting said header portion with the intermediate header; laterally extending tubes leading from the intermediate header to the header spaced therefrom; and means varying the proportionate gas flow at opposite sides of the intermediate header.

10. In a boiler, the combination of water-containing steam generating lower members and connected upper members comprising an upwardly extending header portion receiving at its lower end the up-flow from the lower members; at least three upwardly extending headers spaced from each other and from the upwardly extending header portion; laterally extending gas heated tubes connecting said header portion with the adjacent intermediate header; laterally extending tubes connecting the intermediate headers; laterally extending tubes leading from the last intermediate header to the header spaced therefrom; and means varying the proportionate gas flow at opposite sides of the intermediate header.

11. In a boiler, the combination of water-containing steam generating lower members and connected upper members comprising an upwardly extending header portion receiving at its lower end the up-flow from the lower members; two upwardly extending headers spaced from each other and from the upwardly extending header portion; laterally extending gas heated tubes connecting said header portion with the intermediate header; laterally extending tubes leading from the intermediate header to the header spaced therefrom; return connections from said headers to the water-containing members; and means varying the proportionate gas flow at opposite sides of the intermediate header.

12. In a boiler, the combination of water-containing steam generating lower members and connected upper members comprising an upwardly extending header portion receiving at its lower end the up-flow from the lower members; at least three upwardly extending headers spaced from each other and from the upwardly extending header portion; laterally extending gas heated tubes connecting said header portion with the adjacent intermediate header; laterally extending tubes connecting the intermediate headers; laterally extending tubes leading from the last intermediate header to the header spaced therefrom; return connections from said headers to the water containing members; and means varying the proportionate gas flow at opposite sides of the intermediate headers.

13. In a boiler, the combination of a plurality of units placed side by side, each including water-containing steam generating lower members and connected upper members comprising an upwardly extending header portion receiving at its lower end an up-flow from the lower members; and gas heated tubes of greater capacity than the header and extending laterally from the header in stepped relation to each other and to the water level to vary the wetting of the tubes with variations of the steaming condition of the up-flow, said laterally extending tubes being laterally separated into banks by a plurality of upwardly extending drainage headers into and from which the laterally arranged tubes extend.

14. In a boiler, the combination of an upwardly extending up-take header receiving the up-flow; a down-take header; water tubes between said headers; laterally extending gas heated tubes connecting the upper parts of said headers, said laterally extending tubes being of greater capacity than the up-take header and stepped with relation to each other and to the water level to vary the wetting of the tubes with variations of the steaming conditions of the up-flow, the upper lateral tubes being above the normal water level and the lower lateral tubes being below the water level; and a separator header between the up-take and down-take headers.

15. In a boiler, the combination of an upwardly extending up-take header receiving the up-flow; a down-take header; water tubes between said headers; laterally extending gas heated tubes connecting the upper parts of said headers, said laterally extending tubes being of greater capacity than the up-take header and stepped with relation to each other and to the water level to vary the wetting of the tubes with variations of the steaming conditions of the up-flow, the upper lateral tubes being above the normal water level and the lower lateral tubes being below the water level; and a plurality of drainage headers between the up-take and down-take headers.

16. In a boiler, the combination of an up-take header receiving the up-flow; a down-take header; water tubes connecting said headers; a drainage header between the up-take and down-take headers; laterally extending tubes connecting the up-take and drainage headers; laterally extending gas heated tubes connecting the separator header and the down-take header, said laterally extending tubes being in stepped relation to each other and to the water level, the upper laterally extending tubes being above the normal water level; and a feed water inlet at the bottom of the drainage header.

17. In a boiler, the combination of a series of up-take headers; a series of down-take headers, the down-take headers having an upper portion of rectangular form and a portion below the upper portion and connected therewith by tubes providing a space between adjoining headers; tubes joining the up-take headers and the lower portions of the down-take headers; a series of drainage headers arranged side by side and between the up-take and down-take headers; gas heated tubes connecting the drainage headers with the up-take and down-take headers; water inlet tubes extending through the spaces formed by the tubes in the down-take headers and leading to the drainage headers; and tubes leading from the drainage headers to the down-take headers.

18. In a boiler, the combination of an up-take header; a down-take header; water tubes connecting said headers; laterally extending gas heated tubes extending from the upper portion of the up-take header to the upper portion of the down-take header, said tubes being in stepped relation relatively to each other and to the water level, some of the laterally extending tubes being above the normal water level; a steam discharge at the upper end of the down-take header; a connection between the steam discharge and the bottom end of the down-take header; and a water gauge in said connection.

19. The method of generating steam which consists in heating the liquid while in motion to form a mixture of liquid and steam; causing the mixture both water and steam to flow horizontally in the same direction at low velocity as compared with the immediately preceding velocity while the liquid partially separates from the steam; draining off the separated liquid; causing causing the remaining mixture to flow at low velocity while the remainder of the liquid separates from the steam.

20. The method of generating steam which consists in heating the liquid while in motion to form a mixture of liquid and steam; causing the mixture both water and steam to flow horizontally in the same direction at low velocity as compared with the immediately preceding velocity while the liquid partially separates from the steam; draining off the separated liquid; causing the remaining mixture to flow at low velocity while the remainder of the liquid separates from the steam; and draining off the separated liquid.

21. The method of generating steam which consists in heating the liquid while in motion to form a mixture of liquid and steam; causing the mixture both water and steam to flow horizontally in the same direction at low velocity as compared with the immediately preceding velocity while the liquid partially separates from the steam; draining off the separated liquid, causing the remaining mixture to flow at low velocity while the remainder of the liquid separates from the steam; and applying heat to the steam and liquid during their horizontal flow.

22. The method of generating steam which consists in heating the liquid while in motion to form a mixture of liquid and steam; causing the mixture to flow horizontally at low velocity while the liquid partially separates from the steam; draining off the separated liquid; causing the remaining mixture to flow horizontally at low velocity while the remainder of the liquid separates from the steam; applying heat to the steam and liquid during their horizontal flow; and controlling the proportionate application of heat to zones lying each side of the drainage point.

23. The method of generating steam which consists in heating the liquid while in motion to form a mixture of liquid and steam; causing the mixture to flow horizontally at low velocity while the liquid partially separates from the steam; draining off the separated liquid; causing the remaining mixture to flow horizontally at low velocity while the remainder of the liquid separates from the steam; draining off the separated liquid; and controlling the proportionate application of heat between drainage points.

24. The method of generating steam at pressure above atmospheric which consists in heating the liquid to form a mixture of liquid and steam; permitting liquid to settle out of the mixture while it flows horizontally at comparatively low velocity; draining off the liquid at a point in the horizontal path; and permitting the mixture to flow horizontally beyond that point at a lower velocity.

25. The method of generating steam at pressure above atmospheric which consists in heating the liquid to form a mixture of liquid and steam; constraining the mixture to travel at a lower velocity which will permit a part of the liquid to separate out from the mixture; draining off the separated liquid; and advancing the remainder of the mixture horizontally at lower velocity.

26. The method of generating steam which consists in applying heat to streams of liquid flowing upwardly, collecting the mixture of steam and liquid, subdividing it into streams and causing it to flow horizontally at lower velocity than the up-flow, whereby the liquid is partially removed from the mixture by the action of gravity and adhesion to the confining surfaces, draining off the separated liquid and causing further subdivided horizontal flow of the mixture.

27. The method of generating steam which consists in forming steam in an upward flow of water by the application of heat, collecting the mixture of steam and water, causing the mixture to flow horizontally at lower velocity than the up-flow in the form of a multiplicity of streams, separating liquid and steam by gravity and by adherence to the confining surfaces, draining off the separated liquid, and repeating until the steam has the desired dryness.

28. The method of generating steam which consists in forming steam in an upward flow of water by the application of heat, collecting the mixture of steam and water, causing the mixture to flow horizontally at low velocity in the form of a multiplicity of streams, separating the liquid and steam by gravity and by adherence to separate the liquid, draining off the separated liquid, repeating until the steam has the desired dryness, and subjecting the steam and liquid to heat apportioned to the various stages to vary the evaporation and the superheat.

29. In a boiler, the combination of a plurality of units arranged side by side, each having an up-take header; a down-take header; water tubes between said headers; and laterally extending tubes connecting the up-take and down-take headers with the discharge of said tubes related to the inlets to create a one-way flow of steam and water from the up-take header to the down-take header, said tubes being in stepped relation relatively to each other and some of the laterally extending tubes being above the normal water level and some of the lateral tubes being below the normal water level, the laterally extending tubes in adjacent units being staggered with relation to each other.

30. In a boiler, the combination of a plurality of units arranged side by side, each having an up-take header; a down-take header; water tubes between said headers; a drainage header between the upper portions of the up-take and down-take headers; laterally extending gas heated tubes connecting the up-take and drainage headers; and laterally extending tubes connecting the drainage header and the down-take header, said laterally extending tubes being in stepped relation to each other and the water level, some of the laterally extending tubes being above the normal water lever and some below the water level, the laterally extending tubes in adjacent units being staggered with relation to each other.

CARL T. CARLSON.